United States Patent [19]

Ewen et al.

[11] 4,041,494
[45] Aug. 9, 1977

[54] DISTANCE MEASURING METHOD AND APPARATUS

[75] Inventors: Harold I. Ewen, Weston; George G. Haroules, Lexington, both of Mass.

[73] Assignee: The United States of America as represented by the Secretary of the Department of Transportation, Washington, D.C.

[21] Appl. No.: 630,161

[22] Filed: Nov. 10, 1975

[51] Int. Cl.² .............................................. G01S 3/02
[52] U.S. Cl. ............................ 343/112 D; 343/113 R
[58] Field of Search ....................... 343/112 D, 113 R

[56] References Cited

U.S. PATENT DOCUMENTS

| 3,005,200 | 10/1961 | O'Meara | 343/113 R |
| 3,046,549 | 7/1962 | Kalmus | 343/112 D |
| 3,510,871 | 5/1970 | Watanbe et al. | 343/113 R |
| 3,842,419 | 10/1974 | Arndt | 343/112 D |

*Primary Examiner*—Maynard R. Wilbur
*Assistant Examiner*—T. M. Blum
*Attorney, Agent, or Firm*—Herbert E. Farmer; Harold P. Deeley, Jr.

[57] ABSTRACT

The direction and/or distance between a fixed point and a vehicle or between two vehicles located on a common vehicle way are measured by an intermediate frequency interferometric technique wherein signals are transmitted from a single antenna to a receiver system comprising three equally spaced linearly arranged antennas. The technique encompasses determination of the path length differences between the transmitting antenna and each of the receiving antennas. The path length differences are thereafter employed to compute the distance to and/or direction between the transmitting antenna and the linearly aligned receiving antennas.

9 Claims, 5 Drawing Figures

DISTANCE MEASURING METHOD AND APPARATUS

ORIGIN OF THE INVENTION

The invention described herein was made in the course of, or under, a contract with the U.S. Department of Transportation and may be manufactured and used by or for the government of the United States of America for governmental purposes without the payment of any royalties thereon or therefor.

BACKGROUND OF THE INVENTION

1. Field of the Invention

The present invention relates to measurement of the spacing between and/or direction from a first object or location to a second object or location and particularly to determining the position of a vehicle with respect to a fixed position or another vehicle. More specifically, this invention is directed to apparatus for providing information commensurate with the distance between, relative velocity of and direction angle between adjacent vehicles or a vehicle and a fixed object. Accordingly, the general objects of the present invention are to provide novel and improved methods and apparatus of such character.

2. Description of the Prior Art

While not limited thereto in its utility, the present invention is especially well suited to determining the relative positions of mobile vehicles and particularly the relative distance between two vehicles in motion. In the prior art a number of methods are used to determine vehicle position. The nature of the application, and in particular the measurement accuracy requirements and the environment, usually influence the choice of a position determination technique from the available alternatives. Thus, for a rail-type public transportation system the parameters of inter vehicle distance and relative velocity are particularly important for control system "following" modes and collision avoidance. Position angle measurement is obviously not as important as measurement of the distance between vehicles. For air traffic control or aircraft collison avoidance applications, on the other hand, both distance and direction information are of critical importance.

There are, in the prior art, three common methods for measuring range using electromagnetic energy transmission. A first method involves measurement of the round-trip propagation time of a signal which traverses the path to be measured in both directions. This first method makes use of radar or radar beacon techniques wherein distance is determined by measurement of the elapsed time for two-way transmission to appropriately located targets or transponders. Employing radar techniques, velocity may be determined by Doppler frequency measurement. A second prior art range measuring technique involves the use of precision clocks located at either end of the path whose length is to be measured; the clocks operating in conjunction with a signal transmitted in one direction over the path. In measurement techniques which utilize a clock synchronizing mechanism, an important characteristic of the transmitted signal is a unique relationship between a "time signature" and the time of transmission which allows a time difference measurement at the receiving end of the path whose length is to be measured. Such prior art methods for providing distance and velocity measurement by means of one-way transmission require expensive atomic clocks or complex synchronizing clock mechanisms.

A third prior art range measuring technique involves trilateration. Trilateration measurement schemes, for example the well known Gee and Loran long range navigation systems, are limited in their range measurement resolution and utilize comparatively expensive and complex radar-time measurement techniques and apparatus.

SUMMARY OF THE INVENTION

The present invention overcomes the above briefly discussed and other deficiencies and disadvantages of the prior art by providing a novel and improved distance measurement system based on the principles of intermediate frequency interferometry. For a general discussion of intermediate frequency interferometry reference may be had to copending application Ser. No. 542,505, filed Jan. 20, 1975 and entitled "Interferometric Navigation and Guidance System". Application Ser. No. 542,505, the disclosure of which is incorporated herein by reference, is assigned to the assignee of the present invention. Reference may also be had to copending application Ser. No. 549,081, filed Feb. 11, 1975 and entitled "Radio Theodolite Angle Measuring Apparatus", which is also assigned to the assignee of the present invention. In intermediate frequency interferometric techniques the angle related path length differences between a first point and positions spatially displaced along an interferometer baseline are measured in wave lengths at a modulation frequency.

In accordance with the present invention a one-way signal is radiated from a transmitter to a receiver and the receiver determines the position of the transmitter without the aid of clock synchronizing mechanisms, atomic clocks or radar-time measurement techniques. Position determination in accordance with the invention is accomplished through use of a single transmitting antenna which may, for example, be located on a first vehicle and a receiver system including at least three antennas spatially positioned along a common baseline located, for example, on a second vehicle. The common baseline on which the receiving antennas are located will typically be oriented normally to the longitudinal axis of the carrying vehicles motion. The transmitting antenna will radiate a carrier and a sideband signal. The carrier and sideband signals are separately received by each of the three receiving antennas and the thus received pairs of signals are separately heterodyned to derive their difference frequency. The receiver system thus derives three modulation signals at the same frequency but with phase relationships determined by the lengths of the three possible paths between the single transmitting antenna and the three receiving antennas; the receiving antennas being located at either end of and at the midpoint of the baseline. The receiver system includes means for determining the phase differences between pairs of the modulation signals. Additionally, the receiver system includes means for combining signals commensurate with the thus determined phase differences so as to provide outputs commensurate with the distance between the receiver system baseline and transmitter and the direction to the transmitter from the midpoint of the receiver baseline.

BRIEF DESCRIPTION OF THE DRAWING

The present invention may be better understood and its numerous objects and advantages will become more apparent to those skilled in the art by reference to the accompanying drawing wherein.

DESCRIPTION OF THE PREFERRED EMBODIMENT

Figure 1:
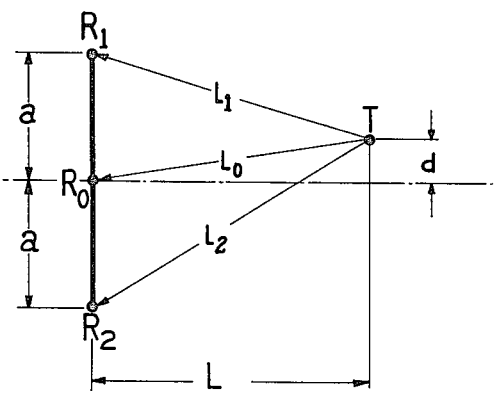
FIG. 1 is a graphical illustration of the "problem geometry" upon which the present invention is based.

With reference to FIG. 1, the geometrical arrangement of a single transmitting antenna T and three receiving antennas $R_1$, $R_0$ and $R_2$ in accordance with a preferred embodiment of the invention is depicted. In the application of the preferred embodiment to the mobile vehicle monitoring and control system represented in FIG. 2, the transmitting antenna T is located on a first vehicle and the three receiving antennas $R_1$, $R_0$ and $R_2$ are respectively located at either end and at the midpoint of a baseline of length $2a$ on a second vehicle. The baseline is oriented perpendicularly to the longitudinal axis of the second vehicle; the second vehicle normally moving along an extension of said axis. The signal transmitted by antenna T consists of a carrier frequency, $f_c$, and a sideband frequency, $f_c + f_m$.

The carrier frequency and associated sideband frequency $f_c + f_m$ are received at antenna $R_1$ over the path $L_1$ and are heterodyned to derive their difference or modulation frequency $f_m(L_1)$. The carrier and sideband signals received by antenna $R_0$ over path $L_0$ are heterodyned to drive the modulation frequency $f_m(L_0)$. In a similar manner the transmitted carrier and sideband signals received at antenna $R_2$ over path length $L_2$ are processed to extract the modulation frequency $f_m(L_2)$. The three signals at the modulation frequency derived in the manner described above, although at the same frequency $f_m$ by virtue of their means of transmission, each bear a phase relationship determined by the individual path length traveled between the transmitting antenna and the respective receiving antennas $R_1$, $R_0$ and $R_2$. Thus, the modulation frequency derived by heterodyning the carrier and sideband signals transmitted from antenna T and received at receiving antenna $R_1$ will bear a phase relationship determined by the path $L_1$. Similarly, the modulation frequency signals derived by heterodyning the carrier $f_c$ and sideband signal $f_c + f_m$ received at antennas $R_0$ and $R_2$ will bear phase relationships determined by the length of the paths $L_0$ and $L_2$ respectively. The phase difference between the two modulation frequencies $f_m(L_1)$ and $f_m(L_0)$ is commensurate with the path length difference $(L_1 - L_0)$. The phase difference between the modulation frequencies $f_m(L_2)$ and $f_m(L_0)$ is similarly commensurate with the path length difference $(L_2 - L_0)$.

The next step performed in accordance with the present invention, subsequent to generation of signals commensurate with the path length differences $(L_1 - L_0)$ and $(L_2 - L_0)$, is to combine these phase difference signals in such a manner as to provide an indication or measurement of the distance from the transmitter to the receiver and, if necessary or desirable, the bearing angle of the transmitter relative to the normal to the receiver baseline.

The distance measurement is accomplished by combining the previously described phase differences in an algebraic sum circuit to obtain a composite phase $\phi$ given by:

$$\epsilon \phi = \frac{2\pi}{\lambda_m} [(L_1 - L_0) - (L_2 - L_0)] \tag{1}$$

where $\lambda_m$ is the wavelength at the modulation frequency $f_m$.

The measurement of angular displacement of the transmitter relative to the normal to the receiver baseline is accomplished by combining the previously described phase differences in an algebraic difference circuit to obtain a composite phase $\delta\phi$ given by:

$$\delta \phi = \frac{2\pi}{\lambda_m} [(L_1 - L_0) + (L_2 - L_0)] \tag{2}$$

The geometrical relationship between the phase sum $\Sigma\phi$ and the distance $L$ and the phase difference $\delta\phi$ and the angular displacement $d/L$ can be seen from the following:

$$L_1^2 = L^2 + (a-d)^2 = L^2 \left[ 1 + \frac{(a-d)^2}{L^2} \right] \tag{3}$$

For the condition $L >> a$ or $d$ $$L_1 = L \left[ 1 + \frac{(a-d)^2}{2L^2} \right] \tag{4}$$

The distance $L_0$ can be expressed as:

$$L_0^2 = L^2 + d^2 = L^2 \left[ 1 + \frac{d^2}{L^2} \right] \tag{5}$$

$$\text{or } L_0 = L \left[ 1 + \frac{d^2}{2L^2} \right]$$

and $L_2$, in a similar manner, can be expressed in the form:

$$L_2^2 = L^2 + (a+d)^2 \text{ or } L_2^2 = L^2 \left[ 1 + \frac{(a+d)^2}{L^2} \right] \tag{6}$$

and for $L >> a$ or $d$ $$L_2 = L \left[ 1 + \frac{(a+d)}{2L^2} \right] \tag{7}$$

Combining equations (4) and (5), the path length difference $L_1 - L_0$ takes the form:

$$L_1 - L_0 = \frac{1}{2L} [(a-d)^2 - d^2] \quad (8)$$

$$= \frac{1}{2L} (a^2 - 2ad).$$

Similarly, by combining equations (7) and (5), the path length difference $L_2 - L_0$ becomes:

$$L_2 - L_0 = \frac{1}{2L} [(a+d)^2 - d^2] \quad (9)$$

$$= \frac{1}{2L} (a^2 + 2ad)$$

The path length difference $L_1 - L_0$ can be expressed as a phase difference $\phi_1$ at the modulation frequency $f_m$, where:

$$\phi_1 = \frac{2\pi}{\lambda_m} (L_1 - L_0) \quad (10)$$

In a similar manner the path length difference $L_2 - L_0$ can be expressed as:

$$\phi_2 = \frac{2\pi}{\lambda_m} (L_2 - L_0) \quad (11)$$

Combining equations (8) and (9), the difference between these two phase differences is:

$$\delta\phi = (\phi_1 - \phi_2) = \frac{2\pi}{\lambda_m} \left[ \frac{-4ad}{2L} \right] = \frac{-4\pi ad}{\lambda_m L} \quad (12)$$

and the sum of the two phase differences is:

$$\epsilon\phi = (\phi_1 + \phi_2) = \frac{2\pi}{\lambda_m} \left[ \frac{2a^2}{2L} \right] = \frac{2\pi a^2}{\lambda_m L} \quad (13)$$

Hence, from equation (12), the angular displacement ($d/L$) of point T relative to the normal to the transmitting baseline, as viewed at its midpoint ($R_0$), is:

$$\frac{d}{L} = -\frac{\lambda_m(\phi_1 - \phi_2)}{4\pi a} \quad (14)$$

and, from equation (13), the distance between point T and the receiving baseline is:

$$L = \frac{2\pi a^2}{\lambda_m(\phi_1 + \phi_2)} \quad (15)$$

If the length of the transmitting baseline is designated as A; i.e., $A = 2a$; then equations (14) and (15) can respectively be rewritten in the form:

$$\frac{d}{L} = -\frac{\lambda_m(\phi_1 - \phi_2)}{2\pi A} \quad (16)$$

and $$L = \frac{\pi A^2}{2\lambda_m(\phi_1 + \phi_2)} \quad (17)$$

Figure 2:
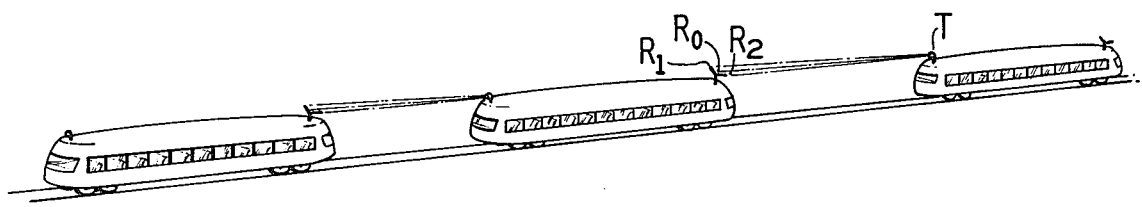
FIG. 2 illustrates the application of the invention to a mobile vehicle monitoring and control system.

A graphical illustration of the application of the present invention to the case of vehicle-to-vehicle distance measurement is shown in FIG. 2. The receiving antennas $R_1$, $R_0$ and $R_2$ are located on a common baseline near the front of each vehicle. The transmitting antenna T is located at the back of each vehicle. Antenna directivities are such that the transmitting antenna views the region behind the vehicle and the receiving antennas the region forward the vehicle.

Figure 3:
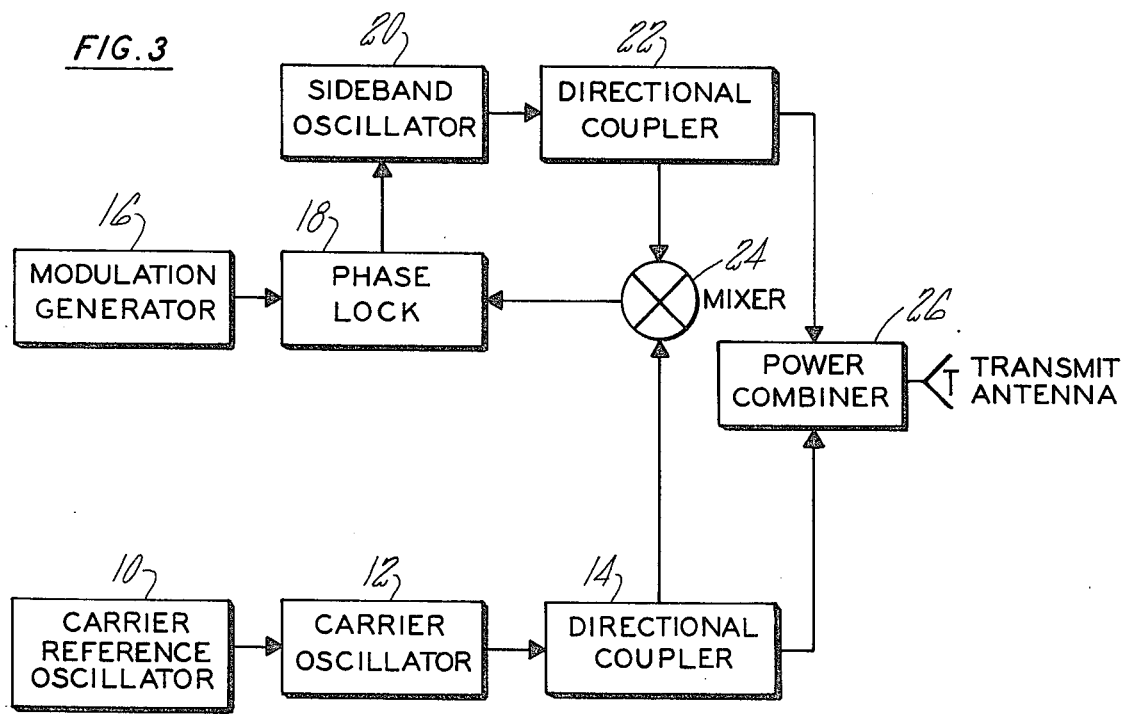
FIG. 3 is a functional block diagram of a preferred embodiment of a transmitter for use in practice of the present invention.

FIG. 3 is a functional block diagram of the transmitter in accordance with the preferred embodiment of the invention. In the transmitter of FIG. 3 separate oscillators 12 and 20 are used to generate the carrier and sideband signals respectively. The carrier frequency oscillator 12 is controlled by a carrier reference oscillator 10 which serves as a phase lock reference. The frequency of carrier reference oscillator 10 is selected by crystal, with the crystal frequency typically being equal to approximately 1/48 of the desired output frequency of carrier frequency oscillator 12.

The output frequency of a modulation generator 16 is selected by crystal in the range from 50 to 125 MHz. Modulation generator 16 includes a frequency doubler which provides modulation generator frequency coverage up to a frequency of 25 MHz, in those modes of operation when the carrier frequency is in the C-Band region; i.e., 5.000 to 5.200 GHz.

The frequency of sideband oscillator 20 is controlled by a phase lock loop that maintains the sideband frequency equal to the sum of the carrier frequency derived from oscillator 12 and the modulation frequency provided by modulation generator 16. This frequency control is accomplished by heterodyning the carrier oscillator frequency with the sideband oscillator frequency in mixer 24. The mixer 24 receives its input carrier oscillator and sideband oscillator frequency signals respectively from directional couplers 14 and 22 via their sidearms. The main arms of couplers 22 and 24 are respectively interconnected in the signal paths from oscillators 12 and 20 to a power combiner 26. The heterodyning action of mixer 24 provides an output difference frequency to phase lock circuit 18, located in the feed back loop to the sideband oscillator 20. The output modulation generator 16 is fed as a reference input signal to the phase lock circuit 18 thereby establishing the frequency and phase relationship between the output of carrier oscillator 12 and the output of sideband oscillator 20. The phase lock circuit 18 adjusts the sideband oscillator frequency and phase such that the heterodyned signal derived from the mixing action within mixer 24 is identical in frequency and phase to the modulation generator output signal frequency and phase.

The carrier oscillator signal and sideband oscillator signal are combined in power combiner 26; power combiner 26 taking the form of a magic-tee at a C-Band frequency of operation. The output of the power combiner unit 26; i.e., the combined carrier and sideband oscillator signals; is delivered to the transmitting antenna, T.

In the embodiment being described the receiving system contains three separate antennas. Each antenna receives the carrier and sideband signal radiated from the transmitting antenna, T. As described above, and as may be seen from FIGS. 1 and 2, these three receiving antennas are arranged on a common baseline with one antenna element located at either end of the baseline and the third at the midpoint. Identical dual channel double conversion superheterodyne receivers are connected to each of the three receiving antennas. The function of these receivers in each case is to heterodyne the received carrier signal with the received sideband signal to extract a signal at a difference frequency equivalent to the output frequency of the modulation generator at the transmitter. The phase of each of the thus extracted modulation frequency signals is directly related to the path length between the transmitting antenna and a respective of the receiving antennas. The three modulation frequency signals derived by the three identical dual channel double conversion superheterodyne receivers, connected individually to the three receiving antennas, are fed to a common signal processing circuit. The function of this processing circuit is to provide signals commensurate with the phase difference between paired modulation frequency signals corresponding to paired antennas; particularly the phase difference between the modulation frequency obtained from antenna $R_1$, and antenna $R_0$, which provides a measure of the path length difference $L_1 - L_0$, and the phase difference between the modulation frequency obtained from antenna $R_2$ antenna $R_0$, which provides a measure of the path length difference $L_2 - L_0$.

Figure 4:
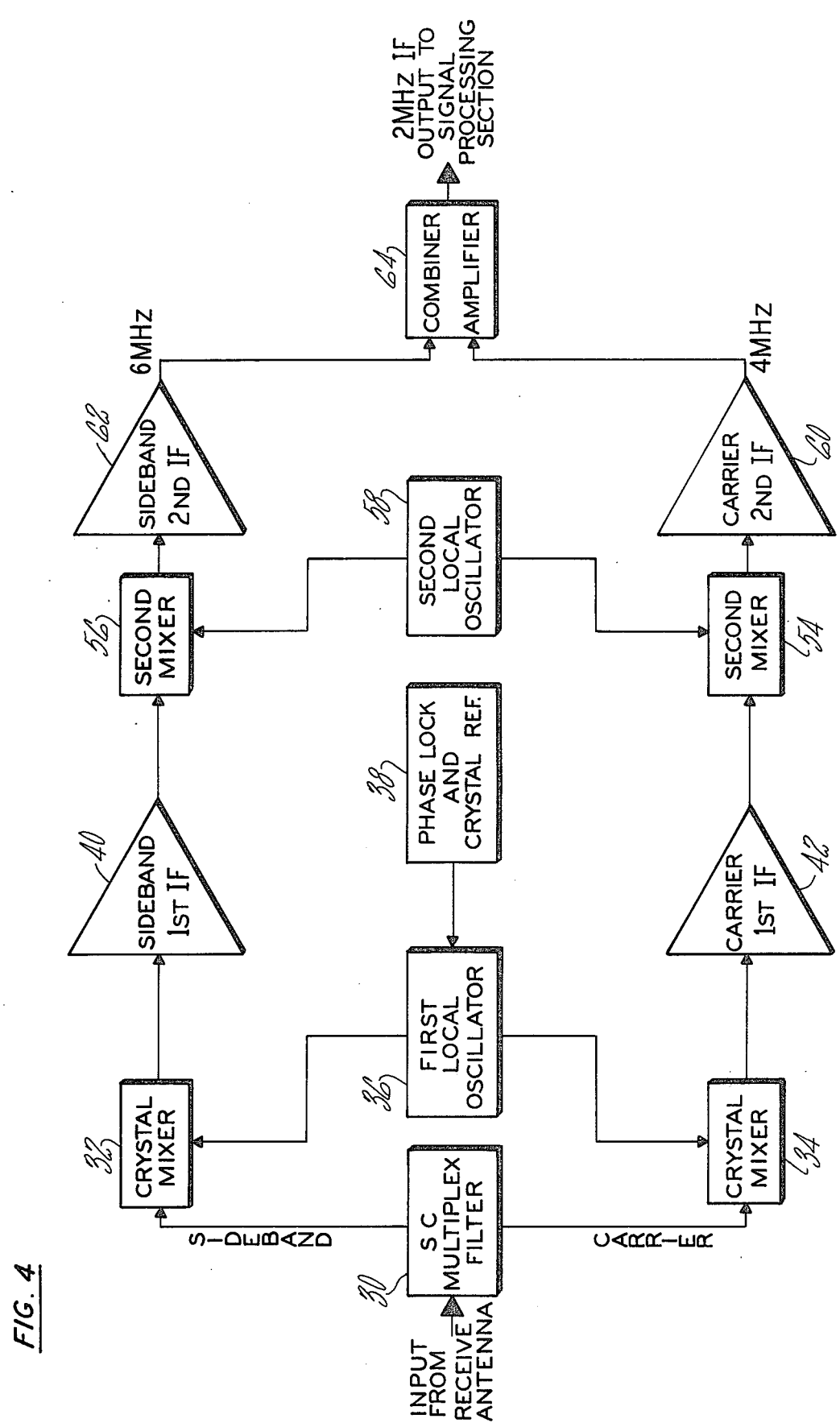
FIG. 4 is a functional block diagram of a receiver for use with the transmitter of FIG. 3, the receiver of FIG. 4 comprising one of three substantially identical receivers which comprise in part the receiving system of the present invention.

Referring to FIG. 4, a dual channel double conversion superheterodyne receiver suitable for connection to one of the receiving antennas in practicing the invention is shown. In the receiver of FIG. 4 the received carrier and sideband signals are coupled from the receiving antenna ($R_1$, $R_0$ or $R_2$) to a multiplex filter 30. Filter 30 provides bandpass filtering and separation of the carrier and sideband signals prior to feeding these signals to separate low-noise crystal mixers 32 and 34, respectively. The carrier and sideband signals are heterodyned in mixers 34 and 32 with the output signal from a first local oscillator 36. The heterodyning signal provided by oscillator 36 is at a frequency between the sideband and carrier frequencies. A crystal reference phase lock circuit 38 establishes both the first local oscillator frequency and frequency stability.

The beat frequency or difference frequency outputs from mixers 32 and 34 are respectively filtered and amplified by sideband and carrier first IF amplifiers 40 and 42. The filtered and amplified sideband and carrier first If signals are fed directly to the IF section of the dual channel receiver. The function of the IF section is to provide further filtering and amplification of the individual carrier and sideband frequencies; this object being accomplished primarily by a second conversion of the first intermediate frequency to a lower second intermediate frequency. The second conversion is followed by heterodyning of the second intermediate frequency of the carrier with the second intermediate frequency signal derived from the sideband to provide a low frequency output signal which bears, as a consequence of the well-known property of preservation of phase in the process of heterodyning, the same phase relationship as the original modulation frequency on reception.

Continuing with the description of FIG. 4, the IF carrier and sideband signal frequencies respectively appearing at the outputs of mixers 34 and 32 are determined by the frequency of the first local oscillator 36 in the RF section. Nominal values of these IF frequencies for a distance measurement system operating in the C-Band region of the spectrum are:
1. Carrier first IF-centered at one half the modulation frequency plus 5 MHz
2. Sideband first IF frequency-centered at one half the modulation frequency minus 5 MHz.

The two IF signals are amplified and filtered in carrier first IF amplifier 42 and sideband first IF amplifier 40. The outputs of amplifiers 40 and 42 are respectively fed to second mixers 54 and 56. In mixers 54 and 56 the IF signals are heterodyned with a signal provided by a second local oscillator 58. The second local oscillator output frequency is typically one half the modulation frequency minus 1 MHz; this frequency being selected such that the difference frequency derived from the second mixer 54 corresponding to the carrier second IF frequency is 4MHz and the sideband difference frequency derived from second mixer 56 is 6 MHz. The carrier and sideband second IF signals at 4 and 6 MHz respectively are further filtered and amplified in second IF amplifiers 60 and 62.

The foregoing assignment of first and second local oscillator frequencies and the corresponding first and second IF frequencies for the carrier and sideband signals are essentially independent of the modulation frequency selected for system operation. In particular the modulation frequency may be at any frequency in the range from 50 to 250 MHz.

The filtered and amplified second IF output frequencies from amplifiers 60 and 62 are heterodyned in combiner/amplifier 64. Combiner 64 performs a third step of frequency conversion by heterodyning the carrier component translated to a frequency of 4 MHz with the sideband signal component which has been translated to a frequency of 6 MHz.

In summary, identical dual channel double conversion superheterodyne receivers, based on well-known techniques for filtering and frequency conversion, and sharing common local oscillators, provide the translation of carrier and sideband signals, received by each of the three antennas, to second intermediate frequencies for both the carrier and sideband signals. These pairs of second IF frequency carrier and sideband signals are then heterodyned to provide final intermediate frequency output signals, typically at a nominal frequency of 2 MHz, in which the phase of each 2 MHz signal is directly related to the path length difference between the transmitting antenna and a specific one of receiving antennas $R_1$, $R_0$ or $R_2$.

The processing of the three receiver output signals to determine the distance and direction from the receiver antenna baseline to the transmitter involves the measurement of the phase difference between the $R_1$ channel output and the $R_0$ channel output, for determination of the path length difference $L_1 - L_0$, and measurement of the phase difference between the $R_2$ channel and $R_0$ channel signals, for determination of the path length difference $L_2 - L_0$. Although these phase differences could be obtained by using relatively simple diode phase detectors, significant improvement in performance can be realized through the use of present-day digital phase difference measurement techniques based on clock pulse counting between crossover times. Circuits of this type are commonly used in digital phase meters; the associated timing mechanism is typical of digital clock circuits.

Figure 5:
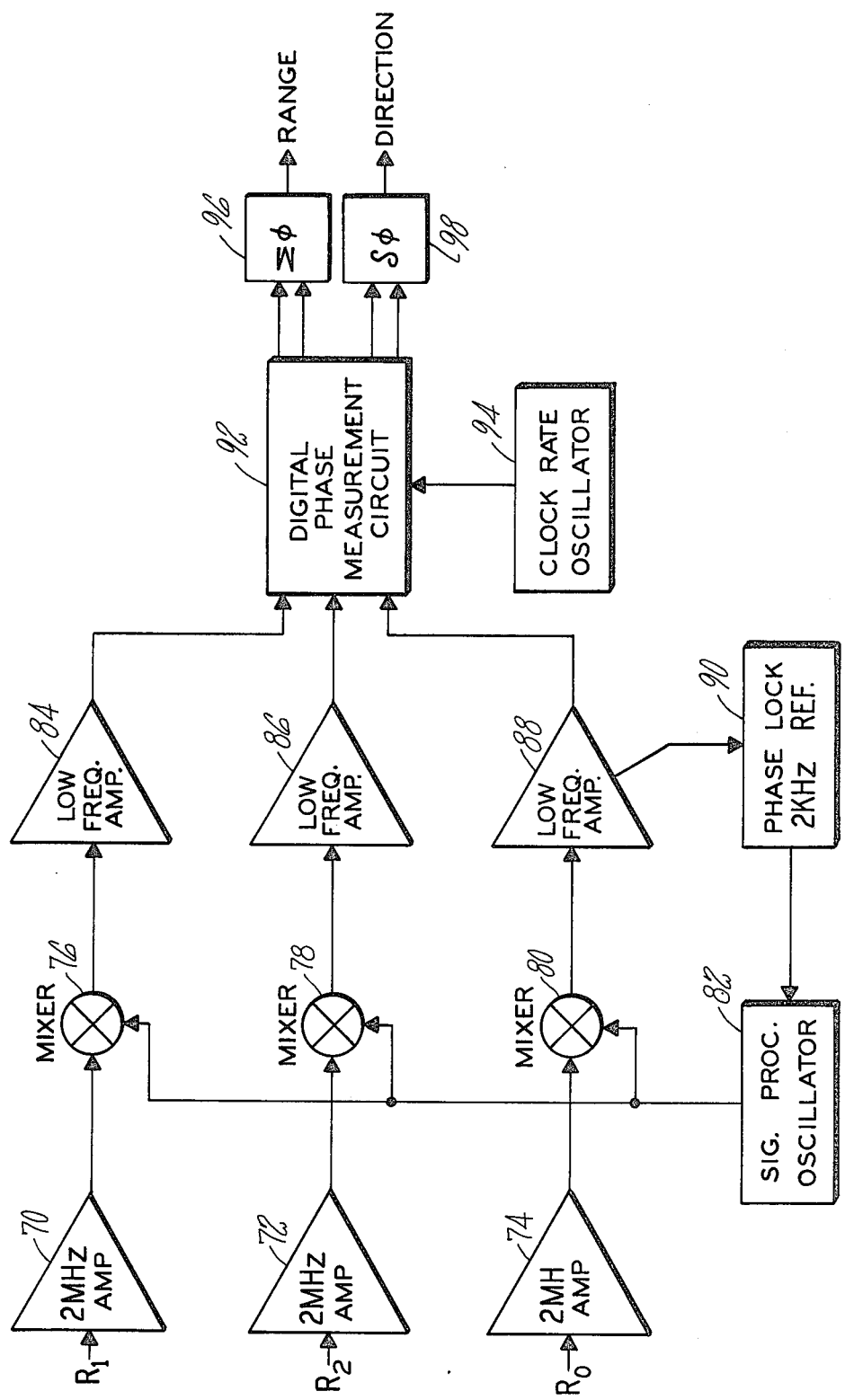
FIG. 5 is a functional block diagram of signal processing circuitry which may be associated with three of the receivers of FIG. 4.

Referring to FIG. 5, which is a block diagram of the signal processing section of a receiver system in accordance with the preferred embodiment of the invention, the output signals from the individual IF sections of the three channels $R_1$, $R_2$ and $R_0$ are respectively filtered and amplified in amplifiers 70, 72 and 74. The output signals from amplifiers 70, 72 and 74 are respectively delivered as input signals to fourth conversion mixers 76, 78 and 80. Continuing with the example frequencies discussed above, the 2 MHz input signal frequencies to mixers 76, 78 and 80 are heterodyned with the output of a common signal processing oscillator 82. The output frequency of oscillator 82 is centered at 1.998 MHz such that the output of each mixer is, in the example being described, a beat frequency signal at 2 KHz. These 2 KHz signals are respectively further amplified by low frequency amplifiers 84, 86 and 88. The output of the signal processing oscillator 82, which is delivered to mixers 76, 78 and 80, is controlled by means of a phase-lock loop 90. The input signal to phase-lock loop 90 is derived from the $R_0$ low frequency amplifier 88. The phase-lock loop circuit 90 results in the output signal from oscillator 82 and thus the signals from mixers 76, 78 and 80 being maintained at precisely the desired frequency.

A digital phase measurement circuit 92 receives the outputs of amplifiers 84, 86 and 88. Phase measurement circuit 92 also receives a clock input from a clock rate oscillator 94. Phase measurement circuit 92 provides output signals commensurate with the measurement of the phase difference between the $R_1$ and $R_0$ channel signals and the phase difference between the $R_2$ and $R_0$ channel signals in accordance with the previously described conventional "time between cross-overs" digital technique. These "phase difference" output signals are delivered in parallel to a summing circuit 96, to derive the distance or range measurement and to a subtraction circuit 98, to derive the direction measurement.

While a preferred embodiment has been shown and described, various modifications and substitutions may be made thereto without departing from the spirit and scope of the invention. Thus, the present invention has application to aircraft landing guidance during roll out or in the provision of guidance information between aircraft in flight to assure safe landings and collision avoidance. The present invention also has applicability to the measurement of separation distance between vehicles on a common way thereby providing intervehicle spacing information for control and collision avoidance. Such spacing information is becoming increasingly important with the renewed interest in railroad trains for rapid transit applications. The invention is also applicable to providing guidance assistance in the preformance of docking maneuvers. While the transmission of radio frequency information has been discussed, it is to be noted that the invention can be practiced employing acoustic waves or modulated coherent light beams. Accordingly, it is to be understood that the present invention has been described by way of illustration and not limitation.

What is claimed is:

1. A method for the measurement of distance comprising the steps of:
    generating a carrier frequency signal;
    generating a modulation signal;
    employing the modulation and carrier signals to generate a first sideband signal at a frequency related to said carrier frequency;
    simultaneously transmitting the carrier and first sideband signals;
    receiving the transmitted carrier and sideband signals at three points linearly spatially displaced along a common baseline;
    extracting the intermediate frequency from the carrier and sideband signals received at each point to thereby provide three intermediate frequency signals each having a different phase relationship commensurate with the respective distances between the point of transmission and points of reception;
    comparing the phase at said intermediate frequency of two pair of the three signals provided by extracting the intermediate frequency to obtain information corresponding to the differences in phase between the compared intermediate frequency signals of each pair; and
    summing the phase differences at the intermediate frequency to provide a measure of the distance from the baseline to the point of transmission.

2. The method of claim 1 further comprising:
    subtracting the phase differences at the intermediate frequency to provide a measure of the angle between the direction normal to the midpoint of the baseline and the direction to the point of transmission.

3. The method of claim 2 wherein the step of extracting each intermediate frequency includes:
    heterodyning the received carrier and sideband signals to derive the intermediate frequency signal.

4. The method of claim 1 wherein the step of receiving the transmitted signals includes:
    positioning three receiving antennas along a common baseline with a separation distance equivalent to the wave length of the modulation signal.

5. The method of claim 4 wherein the step of comparing phase comprises:
    comparing the phase of the signal derived from extraction of the intermediate frequency from the carrier and sideband signals as received at the central of the three antennas with each of the signals derived from extraction of the intermediate frequency from the carrier and sideband signals as received at each antenna located at each end of the baseline.

6. The method of claim 5 wherein the step of extracting the intermediate frequency includes:
    heterodyning the received carrier and sideband signals to derive the intermediate frequency signal.

7. The method of claim 6 comprising:
    subtracting the phase difference information to provide a measure of the angle between the direction normal to the midpoint of the baseline and the direction to the point of transmission.

8. A passive distance measuring system comprising:
    means for generating and simultaneously transmitting a carrier frequency signal and a first sideband signal displaced in frequency from said carrier by an intermediate frequency;
    means for receiving the transmitted carrier and sideband signals, said receiving means including:
        three receiving antennas linearly spatially displaced along a common baseline; and
        heterodyning means connected to each receiving antenna for providing output signals commensurate with said intermediate frequency, each of said intermediate frequency output signals having the same frequency and each of said signals having a phase relationship dependent upon the distance between the respective receiving antenna and the transmitting antenna; and
    means connected to said receiving means and said heterodyning means for comparing the phase of pairs of said intermediate frequency output signals, said comparing means providing an output signal commensurate with the difference between the phase differences of said compared signals as an indication of the direction to the transmitter.

9. The apparatus of claim 8 further comprising:
additional comparing means providing an output signal commensurate with the sum of the phase differences of said compared signals as an indication of the distance between the baseline and the transmitter.

* * * * *